US008934588B2

United States Patent
Yu et al.

(10) Patent No.: US 8,934,588 B2
(45) Date of Patent: Jan. 13, 2015

(54) WIRELESS COMMUNICATION SYSTEM WITH DIRECT CONVERSION MECHANISM AND METHOD OF OPERATION THEREOF

(71) Applicant: Samsung Electronics Co., Ltd., Gyeonggi-Do (KR)

(72) Inventors: Yingqun Yu, San Diego, CA (US); Heejin Roh, San Diego, CA (US); Vladislav Sorokine, Del Mar, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/759,682

(22) Filed: Feb. 5, 2013

(65) Prior Publication Data

US 2014/0219402 A1  Aug. 7, 2014

(51) Int. Cl.
*H04B 1/10* (2006.01)
*H04L 1/00* (2006.01)

(52) U.S. Cl.
CPC .................................. *H04L 1/0036* (2013.01)
USPC ........................................... 375/346; 375/316

(58) Field of Classification Search
CPC .... H04N 5/4401; H04B 1/1027; H04B 1/123; H04B 3/32; H04L 1/06; H04L 25/03343; H04L 25/03057; H04L 25/03038; H04L 27/2647
USPC ................... 375/285, 316, 346–350
See application file for complete search history.

(56) References Cited

U.S. PATENT DOCUMENTS

| 5,914,983 | A   | * | 6/1999  | Bowser et al. ............... 375/232 |
| 7,061,994 | B2  |   | 6/2006  | Li et al.                          |
| 7,609,772 | B2  | * | 10/2009 | Yu et al. ..................... 375/260 |
| 7,856,065 | B2  |   | 12/2010 | Jonsson                            |
| 8,036,319 | B2  |   | 10/2011 | Arambepola et al.                  |
| 2002/0122470 | A1 | * | 9/2002  | Heikkila ..................... 375/147 |
| 2008/0205502 | A1 |   | 8/2008  | Lee et al.                         |
| 2009/0034666 | A1 | * | 2/2009  | Lindoff et al. ............... 375/349 |

(Continued)

FOREIGN PATENT DOCUMENTS

WO  2009005199 A1  1/2009

OTHER PUBLICATIONS

F Harris, Digital Filter Equalization of Analog Gain and Phase Mismatch in I-Q Receivers, pp. 793-796, IEEE Internations Conference on Universal Personal Communications, Cambridge, MA, USA, Sep. 1997.

(Continued)

*Primary Examiner* — Vineeta Panwalkar
*Assistant Examiner* — Janice Tieu
(74) *Attorney, Agent, or Firm* — IP Investment Law Group

(57) ABSTRACT

A method of operation of a wireless communication system includes: tuning a receiver front end for receiving a radio-frequency signal; correcting, with an in-phase/quadrature (I/Q) compensation module, an I/Q imbalance from the receiver front end including estimating by a linear minimum mean-square error (LMMSE) module; and processing by a base band receiver for digitizing an output of the I/Q compensation module for generating a receiver data.

20 Claims, 5 Drawing Sheets

(56) References Cited

U.S. PATENT DOCUMENTS

| | | |
|---|---|---|
| 2010/0266067 A1 | 10/2010 | Eitel |
| 2011/0069744 A1 | 3/2011 | Laudel et al. |
| 2012/0115412 A1 | 5/2012 | Gainey et al. |
| 2012/0177151 A1* | 7/2012 | Hormis .................. 375/340 |
| 2012/0178392 A1* | 7/2012 | Hormis .................. 455/205 |

OTHER PUBLICATIONS

L. Anttila, L. Valkama, and M. Renfors, 'Circularity-Based I/Q Imbalance Compensation in Wideband Direct-Conversion Receivers,' IEEE Transactions on Vehicular Technology, vol. 57, No. 4, pp. 2099-2113, Jul. 2008.

* cited by examiner

US 8,934,588 B2

WIRELESS COMMUNICATION SYSTEM WITH DIRECT CONVERSION MECHANISM AND METHOD OF OPERATION THEREOF

TECHNICAL FIELD

An embodiment of the present invention relates generally to a wireless communication system, and more particularly to a system for optimizing a multi-standard wireless communication.

BACKGROUND

Modern multiband radios can support hundreds of stations as well as multiple standards. These radios can receive amplitude modulated (AM) radio, frequency modulated (FM), as well as citizen band (CB) radio. In order to receive these different frequency bands and standards, the receivers must be capable of identifying the input signal within a field of noise and amplify the input signal without also amplifying the noise. A Radio-Frequency (RF) receiver can include various components to amplify and/or filter an RF signal to recover original data carried by the RF signal. The ability of the RF receiver to pull the signal out of the noise can define its range limits.

Multiband radios are a key tool in emergency response situations. Some of these radios are mounted in emergency vehicles including police cars, ambulances, fire trucks, and military vehicles. Others of the multiband radios can be hand held or miniaturized to fit in a pocket or on a wrist. The reliability and range of these devices are key to the success of emergency response teams all over the world.

Many of the techniques used in multiband radio also apply to other forms of wireless communication. Personal communication devices that utilize Global System for Mobile (GSM) Communication, Wideband Code Division Multiple Access (WCDMA), or fourth generation Long-Term Evolution (4G LTE) are all subject to RF interference signals, spectrum spread, and in-phase/quadrature (I/Q) imbalance. Issues such as these can limit the useable range of the personal communication devices and contribute to communication disconnects when switching between transmission sources.

Thus, a need still remains for a wireless communication system with direct conversion mechanism to improve communication ranges and reliability. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a wireless communication including: tuning a receiver front end for receiving a radio-frequency signal; correcting, with an in-phase/quadrature (I/Q) compensation module, an I/Q imbalance from the receiver front end including estimating by a linear minimum mean-square error (LMMSE) module; and processing by a base band receiver for digitizing an output of the I/Q compensation module for generating a receiver data; and interrupting a control unit by the base band receiver for displaying the receiver data on a device.

An embodiment of the present invention provides a method of operation of a wireless communication system including: tuning a receiver front end for receiving a radio-frequency (RF) signal including amplifying the RF signal by a low-noise amplifier; correcting, with an in-phase/quadrature (I/Q) compensation module, an I/Q imbalance from the receiver front end including estimating a conjugate complex by a linear minimum mean-square error (LMMSE) module; and processing by a base band receiver for digitizing an output of the I/Q compensation module for generating a receiver data.

An embodiment of the present invention provides a wireless communication system, including: a receiver front end tuned to receive a radio frequency (RF) signal; an in-phase/quadrature (I/Q) compensation module, coupled to the receiver front end, is configured to correct an I/Q imbalance from the receiver front end includes a linear minimum mean-square error (LMMSE) module; and a base band receiver, coupled to the I/Q compensation module, is configured to generate a receiver data.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
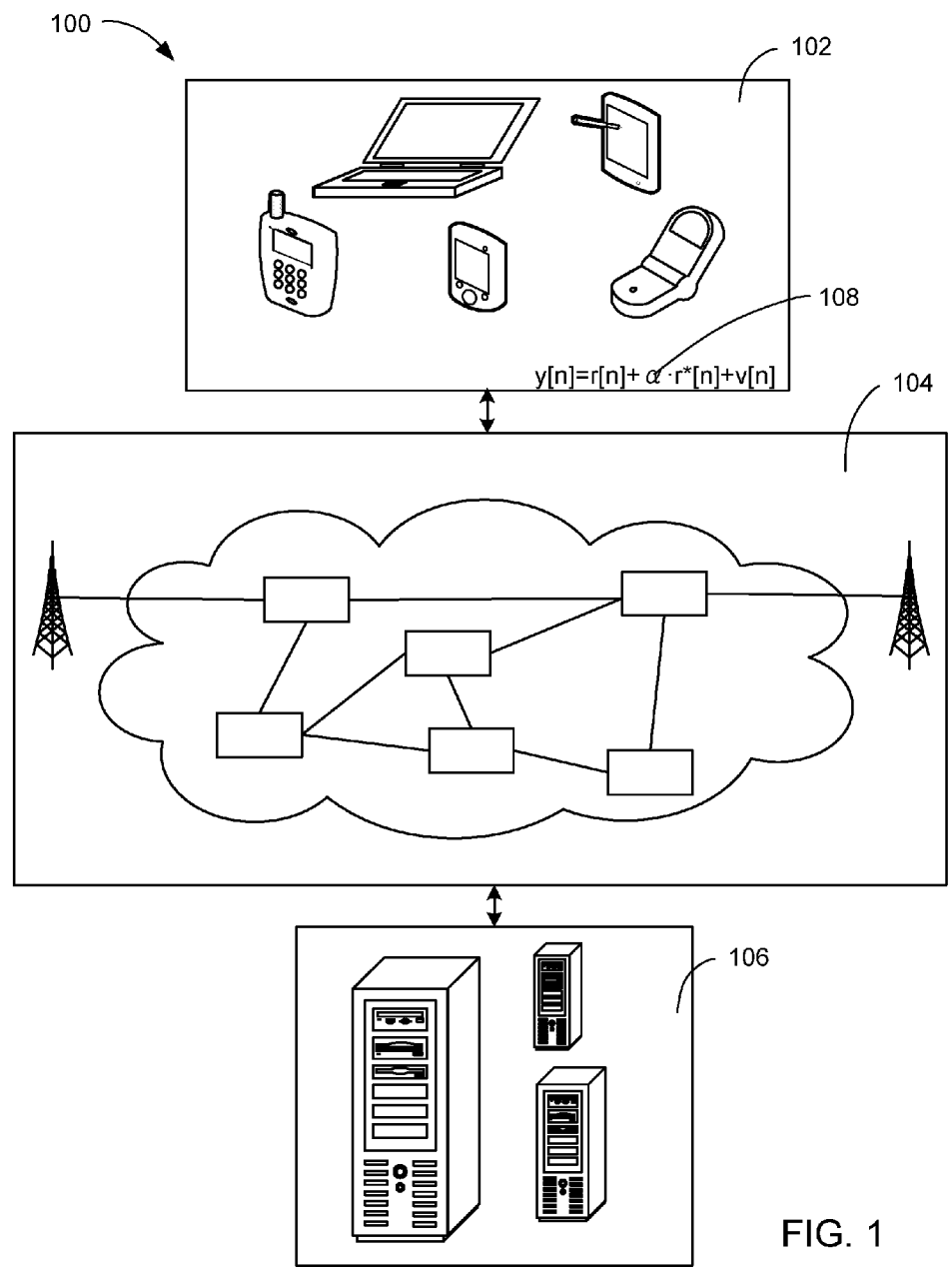
FIG. 1 is a wireless communication system with direct conversion mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "adder" referred to herein is a circuit formed of hardware components used for summing signals without directly joining the individual instances of the signals. The term "direct conversion" referred to herein can include a technique for generating an error signal without using a known reference to isolate the error signal.

Referring now to FIG. 1, therein is shown a wireless communication system 100 with filter mechanism in an embodiment of the present invention. The wireless communication system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

For illustrative purposes, the wireless communication system 100 is described with the first device 102 as a communication device, although it is understood that the first device 102 can be different types of devices. For example, the first device 102 can also be a device for communicating images or a multi-media presentation. A multi-media presentation can be a presentation including sound, a sequence of streaming images or a video feed, or a combination thereof. As an example, the first device 102 can be a high definition television, a computer tablet, a computer monitor, a personal digital assistant, a cellular phone, or a multi-media phone. In another example, the first device 102 can be a signal receiver for receiving broadcast or live stream signals, such as a television receiver, a cable box, a satellite dish receiver, or a web enabled device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof.

The second device 106 can be centralized in a single room, distributed across different rooms, distributed across different geographical locations, embedded within a telecommunications network. The second device 106 can couple with the communication path 104 to communicate with the first device 102.

For illustrative purposes, the wireless communication system 100 is described with the second device 106 as a computing device, although it is understood that the second device 106 can be different types of devices. Also for illustrative purposes, the wireless communication system 100 is shown with the second device 106 and the first device 102 as end points of the communication path 104, although it is understood that the wireless communication system 100 can have a different partition between the first device 102, the second device 106, and the communication path 104. For example, the first device 102, the second device 106, or a combination thereof can also function as part of the communication path 104.

The communication path 104 can span and represent a variety of networks. For example, the communication path 104 can include wireless communication, wired communication, optical, ultrasonic, or the combination thereof. Satellite communication, cellular communication, Bluetooth, Infrared Data Association standard (lrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
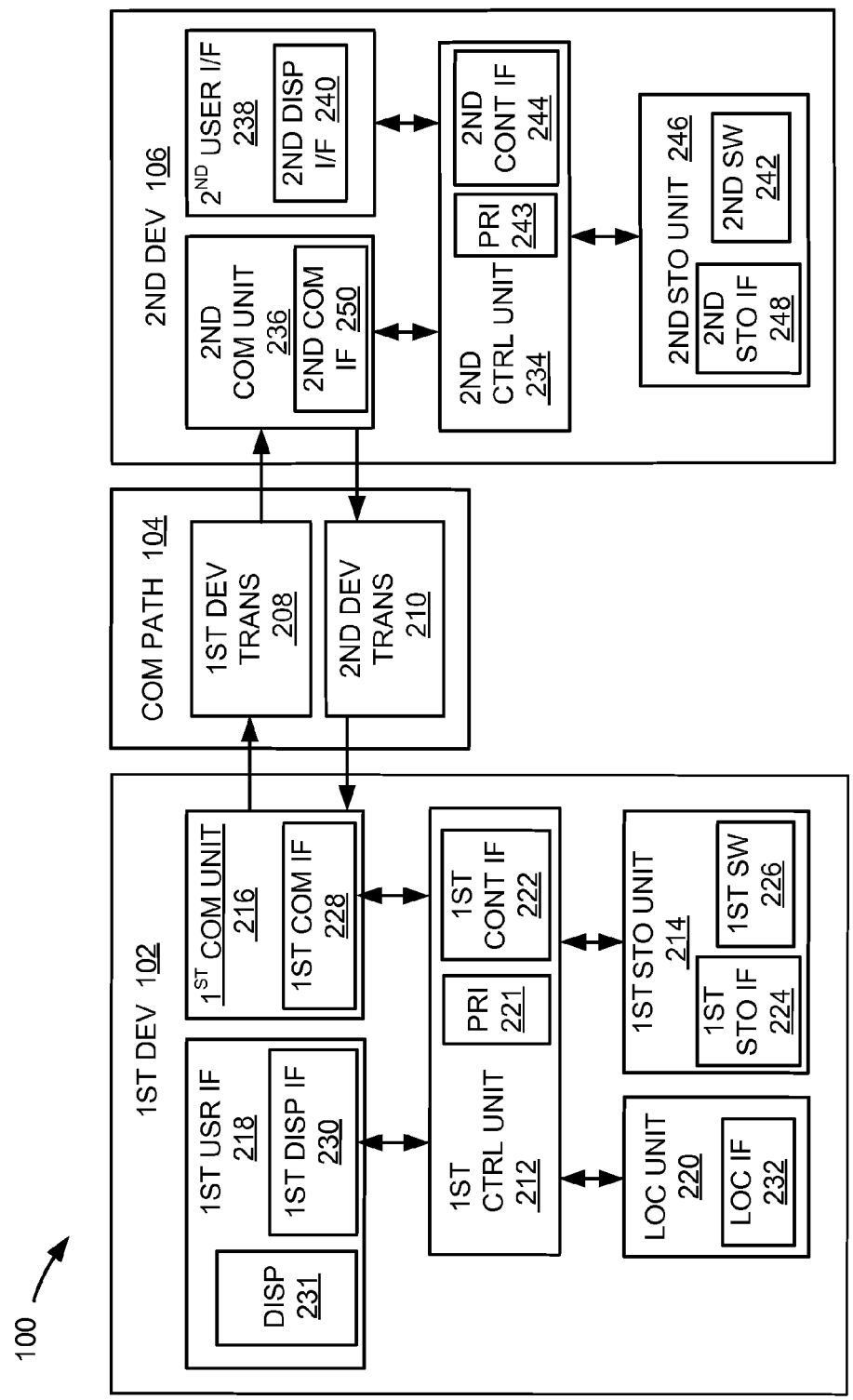
FIG. 2 is an exemplary block diagram of the wireless communication system with direct conversion mechanism in an embodiment of the present invention.

Referring now to FIG. 2, therein is shown an exemplary block diagram of the wireless communication system 100 with direct conversion mechanism in an embodiment of the present invention. The wireless communication system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively.

The first device 102 can send information in a first device transmission 208 over the communication path 104 to the second device 106. The second device 106 can send information in a second device transmission 210 over the communication path 104 to the first device 102.

For illustrative purposes, the wireless communication system 100 is shown with the first device 102 as a client device, although it is understood that the wireless communication system 100 can have the first device 102 as a different type of device. For example, the first device 102 can be a server.

Also for illustrative purposes, the wireless communication system 100 is shown with the second device 106 as a server, although it is understood that the wireless communication system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The communication path 104 can be described as a channel which transports the transmitted signal as well as the interference. While the transmitted signal can be modified by the channel due to transmission losses, the interference and noise that is delivered with the transmitted signal can come from an unknown source and is handled as a discrete value independent of the channel. As such a signal received through the communication path 104 can be characterized by the equation:

$$r[n] = h[n] \otimes s[n] + i[n] \quad \text{Equation 1}$$

Where h[n] is the channel, s[n] is the transmitted signal, and i[n] is the interference and external noise component. This equation assumes that the gain and phase imbalances between I and Q branches at the receiver are frequency independent. It also assumes that the transmitted signal is circular, i.e., $E[s[n]^2] = 0$ for all n. Then, the received signal at the baseband can simply be modeled as:

$$y[n] = r[n] + \alpha \cdot r^*[n] + v[n] \quad \text{Equation 2}$$

Where v[n] is the background thermal noise which can be modeled as zero mean complex Gaussian noise with variance $\sigma^2 = E[|v[n]|^2]$. Here, $\alpha$ denotes frequency independent IQ imbalance measurement ratio 108, a ratio between measured values associated with the I/Q imbalance in signal, given by:

$$\alpha = \frac{1 - g \cdot \exp(j\theta)}{1 + g \cdot \exp(-j\theta)} \quad \text{Equation 3}$$

Where g and $\theta$ denote the gain and phase imbalance, respectively. Then, the input signal to interference and noise ratio (SINR) can be described as:

$$SINR_{in} = \frac{1}{|\alpha|^2 + \sigma^2/E_S} \quad \text{Equation 4}$$

Where $E_S = E[|r[n]|^2]$. It can be shown that the input SINR in the absence of noise can be saturated due to IQ imbalance to be shown by the equation:

$$SINR_{in} = \frac{1}{|\alpha|^2} \text{ (for } \sigma^2 = 0) \quad \text{Equation 5}$$

The first device 102 can include a first control unit 212, a first storage unit 214, a first communication unit 216, a first user interface 218, and a location unit 220. The first device 102 can be of any of a variety of mobile devices, such as a cellular phone, personal digital assistant, a notebook computer, automotive telematic navigation system, or other multifunctional mobile communication or entertainment device. The first device 102 can be a standalone device, or can be incorporated with a vehicle, for example a car, truck, bus, or train.

The first control unit 212 can include a first message priority module 221 and a first control interface 222. The first control unit 212 can be implemented in a number of different manners. For example, the first control unit 212 can be a processor, an embedded processor, a microprocessor, hardware control logic, a hardware finite state machine (FSM), a digital signal processor (DSP), or a combination thereof.

The first message priority module 221 can be implemented in different ways and can include hardware gates, software routines, processors, combinational logic, or a combination thereof. The first message priority module 221 can monitor all communication events received through the first communication unit 216. The first communication unit 216 can receive the communication events which include e-mails, text messages, telephone calls, instant messages, voice over Internet protocol (VOIP) messages, or a combination thereof. The first message priority module 221 can generate a statistical priority for each of the communication events, received by the first communication unit 216, for later processing.

The first message priority module 221 can be coupled to the first control interface 222. The first message priority module 221 can access the first storage unit 214 through the first control interface 222 for storing the statistics related to each of the communication events received from the first communication unit 216.

The first control interface 222 can be implemented in different ways and can include different implementations depending on which functional units or external units are being interfaced with the first controller interface 222. For example, the first controller interface 222 can be implemented with a pressure sensor, an inertial sensor, a micro electro-mechanical system (MEMS), optical circuitry, waveguides, wireless circuitry, wireline circuitry, or a combination thereof.

The first storage unit 214 can include a first storage interface 224. The first storage unit 214 can be a volatile memory, a nonvolatile memory, an internal memory, an external memory, or a combination thereof. For example, the first storage unit 214 can be a nonvolatile storage such as non-volatile random access memory (NVRAM), Flash memory, disk storage, or a volatile storage such as static random access memory (SRAM).

The first storage interface 224 can be can be used for communication between the location unit 220 and other functional units in the first device 102. The first storage interface 224 can also be used for communication that is external to the first device 102.

The first storage interface 224 can receive information from the other functional units or from external sources, or can transmit information to the other functional units or to external destinations. The external sources and the external destinations refer to sources and destinations external to the first device 102.

The first storage interface 224 can include different implementations depending on which functional units or external units are being interfaced with the first storage unit 214. The first storage interface 224 can be implemented with technologies and techniques similar to the implementation of the first controller interface 222. A first software 226 can be stored in the first storage unit 214.

The first communication unit 216 can have a first communication interface 228, including a direct-conversion radio-frequency (RF) receiver or a zero-IF receiver. The first communication unit 216 can enable external communication to and from the first device 102. For example, the first communication unit 216 can permit the first device 102 to communicate with the second device 106, an attachment, such as a peripheral device or a computer desktop, and the communication path 104.

The first communication unit 216 can also function as a communication hub allowing the first device 102 to function as part of the communication path 104 and not limited to be an end point or terminal unit to the communication path 104. The first communication unit 216 can include active and passive components, such as microelectronics or an antenna, for interaction with the communication path 104.

The first communication interface 228 can be used for communication between the first communication unit 216 and other functional units in the first device 102. The first communication interface 228 can receive information from the communication path 104. The coupling between the first communication interface 228 and the communication path 104 can be through a wireless radio-frequency (RF) transmission.

The first communication interface 228 can include a low noise amplifier, a mixer, a phase filter circuit, an I/Q imbalance circuit, and a digital signal processing block. The first communication interface 228 can extract a usable signal from the wireless radio-frequency (RF) transmission received from the communication path 104.

The first communication interface 228 can include different implementations depending on which functional units are being interfaced with the first communication unit 216. The first communication interface 228 can be implemented with technologies and techniques similar to the implementation of the first controller interface 222.

The first user interface 218 can include a first display interface 230. The first user interface 218 can include an input device and an output device. Examples of the input device of the first user interface 218 can include a keypad, a touchpad, soft-keys, a keyboard, a microphone, or any combination thereof to provide data and communication inputs. Examples of the output device of the first user interface 218 can include the first display interface 230. The first display interface 230 can include a display device 231. Examples of the display device 231 can include a projector, a video screen, a speaker, a touch screen, or any combination thereof.

The location unit 220 can include a location interface 232. The location unit 220 can be implemented in many ways. For example, the location unit 220 can function as at least a part of a global positioning system (GPS), an inertial navigation system, a cellular-tower location system, a pressure location system, or any combination thereof.

The location interface 232 can be used for communication between the location unit 220 and other functional units in the first device 102. The location interface 232 can also be used for communication that is external to the first device 102.

The location interface 232 can receive information from the other functional units or from external sources, or can transmit information to the other functional units or to external destinations. The external sources and the external destinations refer to sources and destinations external to the first device 102.

The location interface 232 can include different implementations depending on which functional units or external units are being interfaced with the location unit 220. The location interface 232 can be implemented with technologies and techniques similar to the implementation of the first controller interface 222.

The second device 106 can be optimized for implementing the embodiment of the present invention in a multiple device embodiment with the first device 102. The second device 106 can provide the additional or higher performance processing power compared to the first device 202. The second device 106 can include a second control unit 234, a second communication unit 236, and a second user interface 238.

The second user interface 238 allows a user (not shown) to interface and interact with the second device 206. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second device 106 of the communication system 200. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first device 102 over the communication path 104.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second message priority module 243 and a second controller interface 244. The second controller interface 244 can be used for communication between the second control unit 234 and other functional units in the second device 106. The second controller interface 244 can also be used for communication that is external to the second device 106.

The second message priority module 243 can be implemented in different ways and can include hardware gates, software routines, processors, combinational logic, or a combination thereof. The second message priority module 243 can assist the first message priority module 221 in calculating the priority of the communication events sent to the first device 102.

The second message priority module 243 can calculate a message priority in support of the first message priority module 221. The second message priority module 243 can combine any of the communication events sent by a single user in order to calculate the overall priority of the communication event.

The second controller interface 244 can receive information from the other functional units or from external sources, or can transmit information to the other functional units or to external destinations. The external sources and the external destinations refer to sources and destinations external to the second device 106.

The second controller interface 244 can be implemented in different ways and can include different implementations depending on which functional units or external units are being interfaced with the second controller interface 244. For example, the second controller interface 244 can be implemented with a pressure sensor, an inertial sensor, a micro electro-mechanical system (MEMS), optical circuitry, waveguides, wireless circuitry, wireline circuitry, or a combination thereof.

A second storage unit 246 can store the second software 242. The second storage unit 246 can also store the relevant information, such as contact lists, caller identifications, established groups, recorded messages, response options, priority of the communication events, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the wireless communication system 100 is shown with the second storage unit 246 as a single hierarchy storage system, although it is understood that the navigation system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as non-volatile random access memory (NVRAM), Flash memory, disk storage, or a volatile storage such as static random access memory (SRAM).

The second storage unit 246 can include a second storage interface 248. The second storage interface 248 can be used for communication between the second control unit 234 and other functional units in the second device 106. The second storage interface 248 can also be used for communication that is external to the second device 106.

The second storage interface 248 can receive information from the other functional units or from external sources, or can transmit information to the other functional units or to external destinations. The external sources and the external destinations refer to sources and destinations external to the second device 106.

The second storage interface 248 can include different implementations depending on which functional units or external units are being interfaced with the second storage unit 246. The second storage interface 248 can be implemented with technologies and techniques similar to the implementation of the second controller interface 244.

The second communication unit 236 can enable external communication to and from the second device 206. For example, the second communication unit 236 can permit the second device 106 to communicate with the first device 102 over the communication path 104.

The second communication unit 236 can also function as a communication hub allowing the second device 106 to function as part of the communication path 104 and not limited to be an end point or terminal unit to the communication path 104. The second communication unit 236 can include active and passive components, such as microelectronics or an antenna, for interaction with the communication path 104. The second communication unit 236 can receive the communication events which include e-mails, text messages, telephone calls, instant messages, voice over Internet protocol (VOIP), or a combination thereof on behalf of the first device 102 when the first device 102 is unavailable.

The second communication unit 236 can include a second communication interface 250. The second communication interface 250 can be used for communication between the second communication unit 236 and other functional units in the second device 106. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second controller interface 244.

The first communication unit 216 can couple with the communication path 104 to send information to the second device 106 in the first device transmission 208. The second device 106 can receive information in the second communication unit 236 from the first device transmission 208 of the communication path 104.

The second communication unit 236 can couple with the communication path 104 to send information to the first device 102 in the second device transmission 210. The first device 102 can receive information in the first communication unit 216 from the second device transmission 210 of the communication path 104. The communication system 200 can be executed by the first control unit 212, the second control unit 234, or a combination thereof.

For illustrative purposes, the second device 106 is shown with the partition having the second user interface 238, the second storage unit 246, the second control unit 234, and the second communication unit 236, although it is understood that the second device 106 can have a different partition. For example, the second software 242 can be partitioned differently such that some or all of its function can be in the second control unit 234 and the second communication unit 236. In addition, the second device 106 can include other functional units not shown in FIG. 2 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the wireless communication system 100 is described by operation of the first device 102 and the second device 106. It is understood that the first device 102 and the second device 106 can operate any of the modules and functions of the wireless communication system 100. For example, the first device 102 is described to operate the location unit 220, although it is understood that the second device 106 can also operate the location unit 220.

Figure 3:
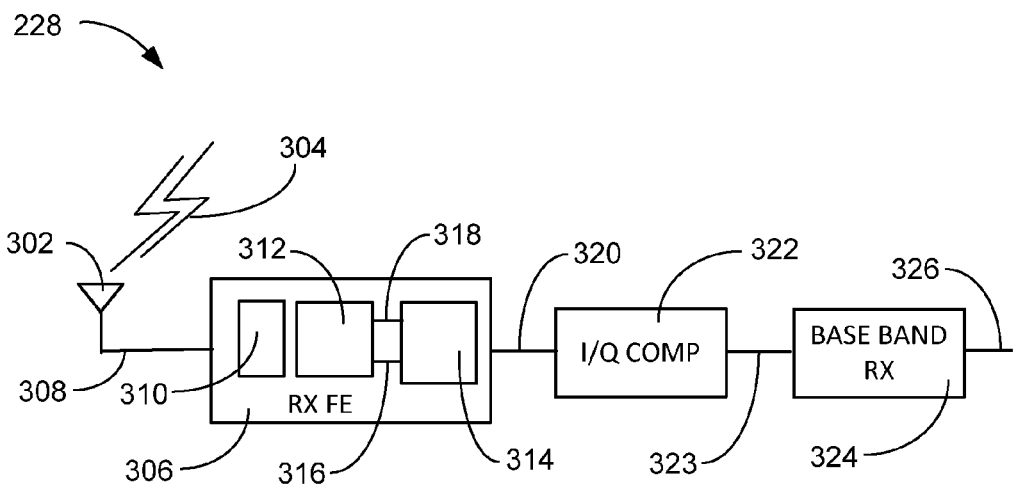
FIG. 3 is an exemplary block diagram of the communication interface of the wireless communication system.

Referring now to FIG. 3, therein is shown an exemplary block diagram of the communication interface 228 of the wireless communication system 100. The exemplary block diagram of the communication interface 228 can include an antenna 302 for receiving a radio-frequency (RF) signal 304 from the communication path 104 of FIG. 1.

The antenna 302 can be coupled to a receiver front-end module 306 for transferring a received signal 308. The receiver front-end module 306 can receive and process the received signal 308. The receiver front-end module 306 can perform the function of impedance matching to the antenna 302, which allows reception of the maximum possible amplitude of the RF signal 304.

The receiver front-end module 306 can also include a low-noise amplifier 310, a mixer circuit 312, and a phase filter 314. The low-noise amplifier 310 can increase the amplitude of the received signal 308.

It is understood that the RF signal 304 can include an intended component and an interference component. The process of amplification through the low-noise amplifier 310 is applied to both components of the RF signal 304. In order to negate the effects of the interference component, the mixer circuit 312 can combine a known amplitude of a local signal that matches the frequency of the intended component of the RF signal 304.

In order to assist in the elimination of the interference component of the RF signal 304, the mixer circuit 312 can generate an in-phase signal 316 and a quadrature signal 318. The quadrature signal 318 can be formed by mixing the received signal 308 that has been amplified by the low-noise amplifier 310 with the local signal that has been phase shifted 90 degrees as compared to the local signal used for the in-phase signal 316.

The phase filter 314 can be coupled to the mixer circuit 314 through the in-phase signal 316 and the quadrature signal 318. The phase filter 314 can reduce the effects of the interference component of the RF signal 304 through a comparison of the filtered versions of the in-phase signal 316 and the quadrature signal 318 in order to generate a composite signal 320. The composite signal 320 can be a digital signal that includes a component mismatch error caused by component differences in the paths of the in-phase signal 316 and the quadrature signal 318.

An in-phase/quadrature (I/Q) compensation module 322 can be applied to the composite signal 320 in order to correct the component mismatch error induced in the composite signal 320. The I/Q compensation module 322 can correct the error in the composite signal 320 caused by the I/Q imbalance, such as the component induced error can be constant or very slowly changing due to heat or power drift effect on the components of the in-phase signal 316 and the quadrature signal 318. The operation of the I/Q compensation module 322 will be discussed further in the description below.

The I/Q compensation module 322 can provide a compensated signal 323, which is coupled to a base band receiver module 324. The base band receiver module 324 can perform a digital signal processing for outputting a receiver data 326. The receiver data 326 represents the intended component of the RF signal 304 and can interrupt the first control unit 212 of FIG. 2 for displaying the receiver data 326 on the display device 231.

The physical transformation from the RF signal 304 through the communication path 104 results in the movement in the physical world, such as directions displayed on the display device 231 transmitted to the first device 102 through the RF signal 304. Movement in the physical world results in changes to the display device 231 by receiving the RF signal 304 through the first communication interface 228.

Figure 4:
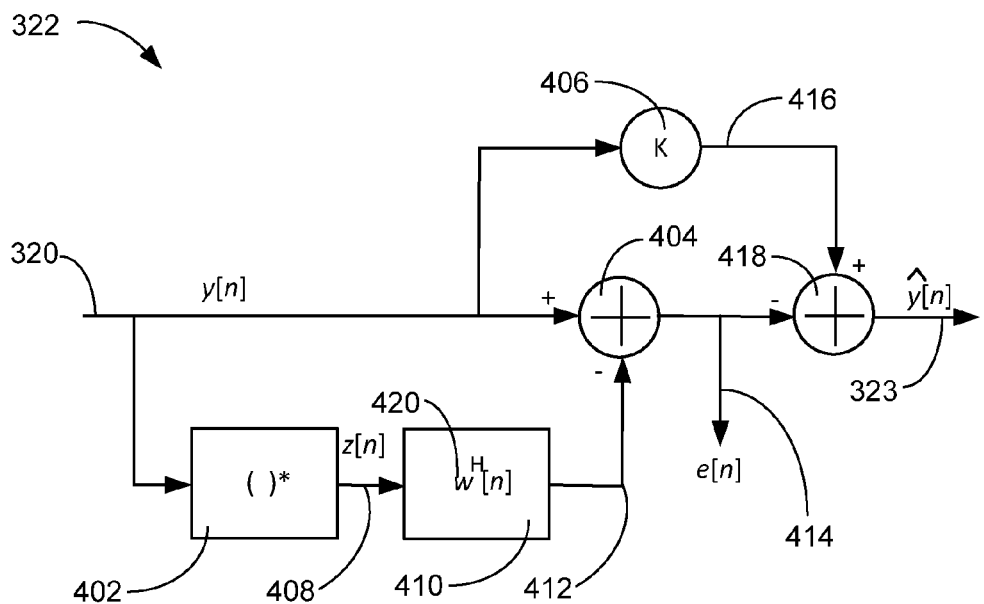
FIG. 4 is an exemplary block diagram of an embodiment of the in-phase/quadrature compensation module of the communication interface of FIG. 3.

Referring now to FIG. 4, therein is shown an exemplary block diagram of an embodiment of the in-phase/quadrature compensation module 322 of the communication interface 228 of FIG. 3. The exemplary block diagram of an embodiment of the in-phase/quadrature compensation module 322 depicts the composite signal 320 coupled to a conjugation module 402, a first adder 404, and an input scaling module 406.

The conjugation module 402 has an input of the composite signal 320 and output a conjugate complex 408. The operation of the conjugation module 402 can be represented by the equation:

$$z[n]=y^*[n] \qquad \text{Equation 6}$$

The input of the composite signal 320 including the I/Q imbalance measurement ratio 108 of FIG. 1 can be represented as having a real component and an imaginary component. The composite signal 320 can be represented by the equation:

$$y[n]=a+jb \qquad \text{Equation 7}$$

Where the value "a" is the real component part of the value. The value of "jb" is the imaginary component part of the value and the term "j" is the square root of −1.

Therefore the value of the conjugate complex signal 408 can be represented by the equation:

$$z[n]=a-jb \qquad \text{Equation 8}$$

Where the value "a" represents the same real component value as the composite signal 320. While the imaginary component is the same magnitude but with an opposite polarity.

The conjugate complex 408 is coupled to a filter coefficient module 410. The filter coefficient module 410, which operates as a linear minimum mean-square error (LMMSE) module 410 for estimation of the conjugate complex 408, can output a correction signal 412 that still contains the I/Q imbalance but now the imaginary component is a polar opposite of the imaginary component of the composite signal 320.

The first adder 404 can have the composite signal 320 coupled to a positive input and the correction signal 412 can be coupled to a negative input, which provides an output of an error sample 414. The error sample 414 can be represented by the equation:

$$e[n]=y[n]-w^H[n]z[n] \qquad \text{Equation 9}$$

Where y[n] is the composite signal 320 and the $w^H[n]z[n]$ is the correction signal 412. The correction signal 412 is based on filter coefficient 420 of the filter coefficient module 410.

The input scaling module 406 can receive the composite signal 320 and apply a scaling factor to provide a scaled output 416. The scaled output 416 can be coupled to the positive input of a second adder 418. The error sample 414 can be coupled to the negative input of the second adder 418 in order to remove the error signal 414 including I/Q imbalance for providing the compensated signal 323 which has the I/Q imbalance removed. The compensated signal can be described by the equation:

$$\hat{y}[n]=y[n]+w^*[n]\cdot z[n] \qquad \text{Equation 10}$$

It has been discovered that by using composite signal 320 with IQ imbalance as the training signal and the conjugate complex 408 as the filter input, the filter coefficient module 410 can generate the correction signal 412 which still contains the IQ imbalance having the imaginary component that can be a polar opposite of the imaginary component in the composite signal 320. Therefore, by adding the scaled output 416 and the error sample 414, the imaginary component caused by IQ imbalance can be removed. In this embodiment of the present invention, the composite signal 320 is used as a training sequence without the need of a dedicated pilot signal. The resulting implementation significantly reduces the complexity and expands the applicability of the embodiment of the present invention.

The wireless communication system 100 has been described with module functions or order as an example. The wireless communication system 100 can partition the modules differently or order the modules differently. For example, the I/Q compensation module 322 can be part of the receiver front end 306 or part of the base band receiver 324 without changing the operational description of the I/Q compensation module 322.

The modules described in this application can be hardware implementation or hardware accelerators in the first control unit 212 of FIG. 2 or in the second control unit 234 of FIG. 2. The modules can also be hardware implementation or hardware accelerators within the first device 102 or the second device 106 but outside of the first control unit 212 or the second control unit 234, respectively.

Figure 5:
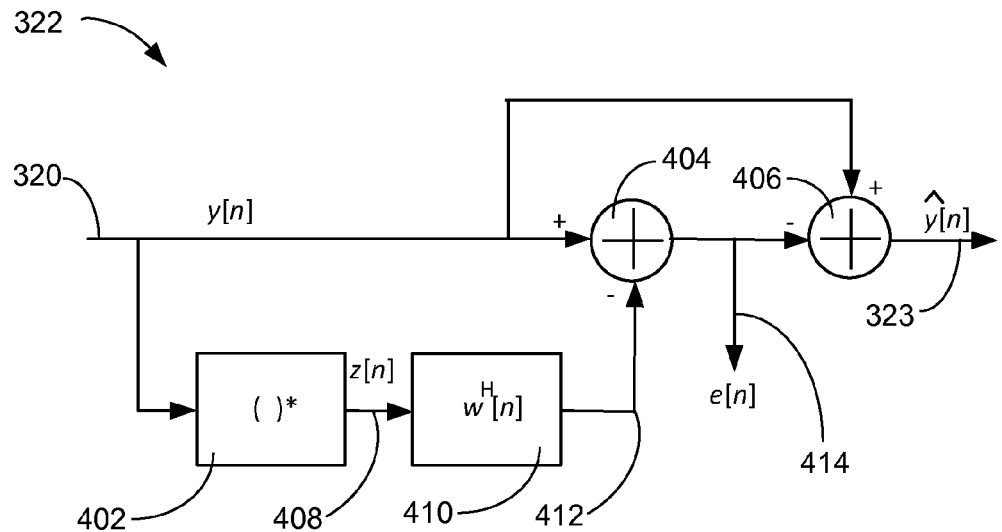
FIG. 5 is an exemplary block diagram of a second embodiment of the in-phase/quadrature compensation module of the communication interface of FIG. 3.

Referring now to FIG. 5, therein is shown an exemplary block diagram of a second embodiment of the in-phase/quadrature compensation module 322 of the communication interface 228 of FIG. 3. The exemplary block diagram of the second embodiment of the in-phase/quadrature compensation module 322 depicts the composite signal 320 coupled to a conjugation module 402, a first adder 404, and a second adder 406.

The conjugation module 402 has an input of the composite signal 320 and output the conjugate complex 408. The operation of the conjugation module 402 can be represented by the equation:

$$z[n]=y^*[n] \qquad \text{Equation 11}$$

The input of the composite signal 320 can be represented as having a real component and an imaginary component. The composite signal 320 can be represented by the equation:

$$y[n]=a+jb \qquad \text{Equation 12}$$

Where the value "a" is the real component part of the value. The value of "jb" is the imaginary component part of the value and the term "j" is the square root of −1.

Therefore the value of the conjugate complex 408 can be represented by the equation:

$$z[n]=a-jb \qquad \text{Equation 13}$$

Where the value "a" represents the same real component value as the composite signal 320. While the imaginary component is the same magnitude but with an opposite polarity.

The conjugate complex 408 is coupled to a filter coefficient module 410. The filter coefficient module 410, which operates as a linear minimum mean-square error (LMMSE) estimation of the conjugate complex 408, can output a correction signal 412 that still contains the I/Q imbalance but now the imaginary component is a polar opposite of the imaginary component of the composite signal 320.

The first adder 404 can have the composite signal 320 coupled to a positive input and the correction signal 412 can be coupled to a negative input, which provides an output of the error sample 414. The error sample 414 can be represented by the equation:

$$e[n]=y[n]-w^H[n]z[n] \qquad \text{Equation 14}$$

Where y[n] is the composite signal 320 and the $w^H[n]z[n]$ is the correction signal 412.

The second adder 406 can receive the composite signal 320 on a positive input and the error sample 414 can be coupled to the negative input of the second adder 406 in order to remove the error sample 414 including I/Q imbalance for providing the compensated signal 323 which has the I/Q imbalance removed. The compensated signal can be described by the equation:

$$\hat{y}[n]=y[n]+w^*[n]\cdot z[n] \qquad \text{Equation 15}$$

It has been discovered that by using composite signal 320 with IQ imbalance as the training signal and the conjugate complex 408 as the filter input, the filter coefficient module 410 can generate the correction signal 412 which still contains the IQ imbalance having the imaginary component that can be a polar opposite of the imaginary component in the composite signal 320. Therefore, by adding the scaled output 416 and the error sample 414, the imaginary component caused by IQ imbalance can be removed. In this embodiment of the present invention, the composite signal 320 is used as a training sequence without the need of a dedicated pilot signal. The resulting implementation significantly reduces the complexity and expands the applicability of the embodiment of the present invention.

The wireless communication system 100 has been described with module functions or order as an example. The wireless communication system 100 can partition the modules differently or order the modules differently. For example, the I/Q compensation module 322 can be part of the receiver front end 306 or part of the base band receiver 324 without changing the operational description of the I/Q compensation module 322.

The modules described in this application can be hardware implementation or hardware accelerators in the first control unit 212 of FIG. 2 or in the second control unit 234 of FIG. 2. The modules can also be hardware implementation or hardware accelerators within the first device 102 or the second device 106 but outside of the first control unit 212 or the second control unit 234, respectively.

Figure 6:
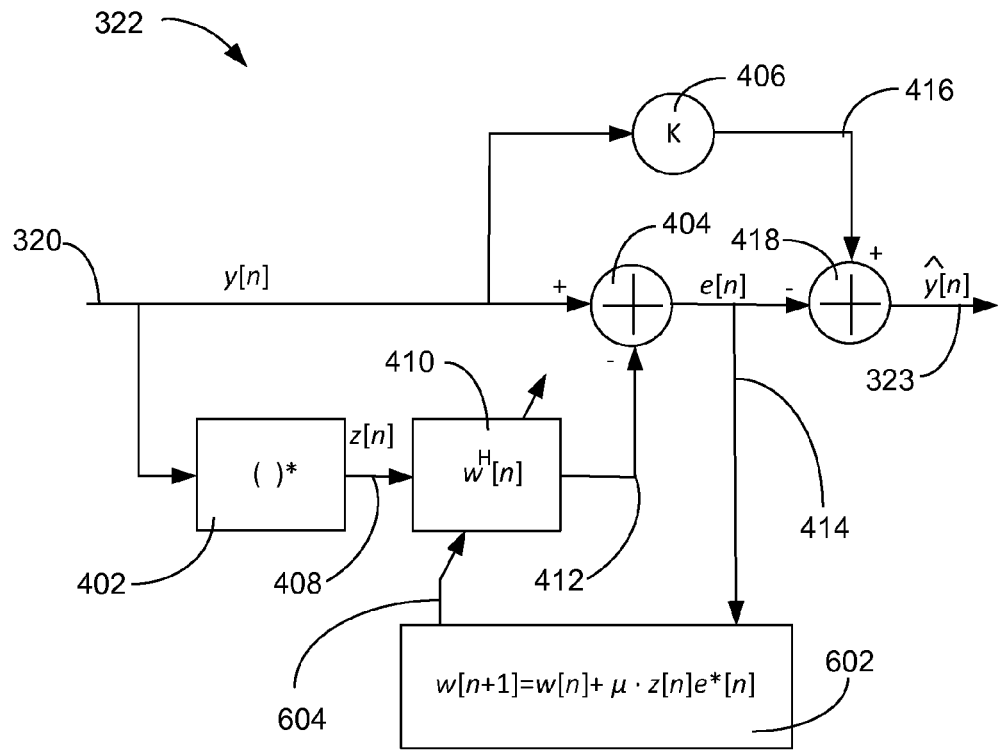
FIG. 6 is an exemplary block diagram of a third embodiment of the in-phase/quadrature compensation module of the communication interface of FIG. 3.

Referring now to FIG. 6, therein is shown an exemplary block diagram of a third embodiment of the in-phase/quadrature compensation module 322 of the communication interface 228 of FIG. 3. The exemplary block diagram of the third embodiment of the in-phase/quadrature compensation module 322 depicts the composite signal 320 coupled to a conjugation module 402, a first adder 404, and an input scaling module 406.

The conjugation module 402 has an input of the composite signal 320 and output the conjugate complex 408. The operation of the conjugation module 402 can be represented by the equation:

$$z[n]=y^*[n] \qquad \text{Equation 16}$$

The input of the composite signal 320 can be represented as having a real component and an imaginary component. The composite signal 320 can be represented by the equation:

$$y[n]=a+jb \qquad \text{Equation 17}$$

Where the value "a" is the real component part of the value. The value of "jb" is the imaginary component part of the value and the term "j" is the square root of −1.

Therefore the value of the conjugate complex 408 can be represented by the equation:

$$z[n]=a-jb \qquad \text{Equation 18}$$

Where the value "a" represents the same real component value as the composite signal 320. While the imaginary component is the same magnitude but with an opposite polarity.

The conjugate complex 408 is coupled to a filter coefficient module 410. The filter coefficient module 410, which operates as a linear minimum mean-square error (LMMSE) estimation of the conjugate complex 408, can output a correction signal 412 that still contains the I/Q imbalance but now the imaginary component is a polar opposite of the imaginary component of the composite signal 320.

The first adder 404 can have the composite signal 320 coupled to a positive input and the correction signal 412 can be coupled to a negative input, which provides an output of the error sample 414. The error sample 414 can be represented by the equation:

$$e[n]=y[n]-w^H[n]z[n] \qquad \text{Equation 19}$$

Where y[n] is the composite signal 320 and the $w^H[n]z[n]$ is the correction signal 412.

The input scaling module 406 can receive the composite signal 320 and apply a scaling factor to provide a scaled output 416. The scaled output 416 can be coupled to the positive input of a second adder 418.

The error sample 414 can also be coupled to an adaptive least-mean-square module 602. The adaptive least-mean-square (LMS) module 602 can analyze the error sample 414 to calculate a coefficient adjustment 604 that can be coupled to the filter coefficient module 410. The adaptive least-mean-square module 602 can calculate the coefficient adjustment by the equation:

$$w[n+1]=w[n]+\mu \cdot z[n]e^*[n] \qquad \text{Equation 20}$$

Where $\mu$ is the interval sample which should be sufficiently small to guarantee its convergence. Accordingly the convergence condition can be assured by establishing the interval sample in the range of:

$$0 < \mu < \frac{2}{E[|y[n]|^2]} \qquad \text{Equation 21}$$

The error sample 414 can be coupled to the negative input of the second adder 418 in order to remove the error sample 414 including I/Q imbalance for providing the compensated signal 323 which has the I/Q imbalance removed. The compensated signal can be described by the equation:

$$\hat{y}[n]=y[n]+w^*[n]\cdot z[n] \qquad \text{Equation 22}$$

It has been discovered that by using composite signal 320 with IQ imbalance as the training signal and the conjugate complex 408 as the filter input, the filter coefficient module 410 can generate the correction signal 412 which still contains the IQ imbalance having the imaginary component that can be a polar opposite of the imaginary component in the composite signal 320. Therefore, by adding the scaled output 416 and the error sample 414, the imaginary component caused by IQ imbalance can be removed. In this embodiment of the present invention, the composite signal 320 is used as a training sequence without the need of a dedicated pilot signal. The resulting implementation significantly reduces the complexity and expands the applicability of the embodiment of the present invention.

The wireless communication system 100 has been described with module functions or order as an example. The wireless communication system 100 can partition the modules differently or order the modules differently. For example, the I/Q compensation module 322 can be part of the receiver front end 306 or part of the base band receiver 324 without changing the operational description of the I/Q compensation module 322.

The modules described in this application can be hardware implementation or hardware accelerators in the first control unit 212 of FIG. 2 or in the second control unit 234 of FIG. 2. The modules can also be hardware implementation or hardware accelerators within the first device 102 or the second device 106 but outside of the first control unit 212 or the second control unit 234, respectively.

It has been discovered that the embodiments of the wireless communication system 100 of FIG. 1 can provide significant improvement in signal to noise ratio (SNR) over the prior art. By way of an example, assuming that the IQ imbalance is relatively small with a high SNR condition ($|\alpha|<<1$, $\sigma^2=0$), the filter coefficient 420 of FIG. 4 can be approximated based on the I/Q imbalance measurement ratio 108 of FIG. 1 to be $w[n]=2\cdot\alpha^*$. The filter coefficient 420 can be approximated directly from a conjugate of the I/Q imbalance measurement ratio 108 and a scalar without any higher-order calculation. Then, the error signal can be obtained as:

$$e[n]=(1-2|\alpha|^2)\cdot r[n]-\alpha\cdot r^*[n] \qquad \text{Equation 23}$$

Since this error signal still includes an image component, the modified estimate to cancel out the residual image component as shown in FIG. 5, given by:

$$\hat{y}[n]=e[n]+y[n]\approx 2(1-|\alpha|^2)\cdot r[n] \qquad \text{Equation 24}$$

For this example the output signal to interference and noise ratio (SINR) can be calculated as:

$$SINR_{out} = \frac{(1+\sigma^2/E_S)^2}{|\alpha|^2 \cdot (|\alpha|^2+\sigma^2/E_S)^2 + ((1+|\alpha|^2+\sigma^2/E_S)^2+|\alpha|^2)\cdot\sigma^2/E_S} \qquad \text{Equation 25}$$

In high SNR regime, the output SINR of equation 23 can be approximated to be:

$$SINR_{out} = \frac{1}{|\alpha|^6 + \sigma^2/E_S} \text{ (for } |\alpha|<<1, \sigma^2 \approx 0\text{)} \qquad \text{Equation 26}$$

The embodiments of the in-phase/quadrature compensation module 322 of the wireless communication system can provide the SNR improvement of $-20 \log|\alpha|$ dB. In providing a further example, if $\alpha$ due to IQ imbalance is 0.1, and the input SNR is 20 dB. Then, if the embodiments of the in-phase/quadrature compensation module 322, as provided in the wireless communication system 100, are used for IQ imbalance compensation the resultant output SNR is 40 dB. The additional margin in SNR provided by the embodiments of the wireless communication system 100 can be used for different technologies such as Global System for Mobile (GSM) Communication, Wideband Code Division Multiple Access (WCDMA), or fourth generation Long-Term Evolution (4G LTE).

Figure 7:
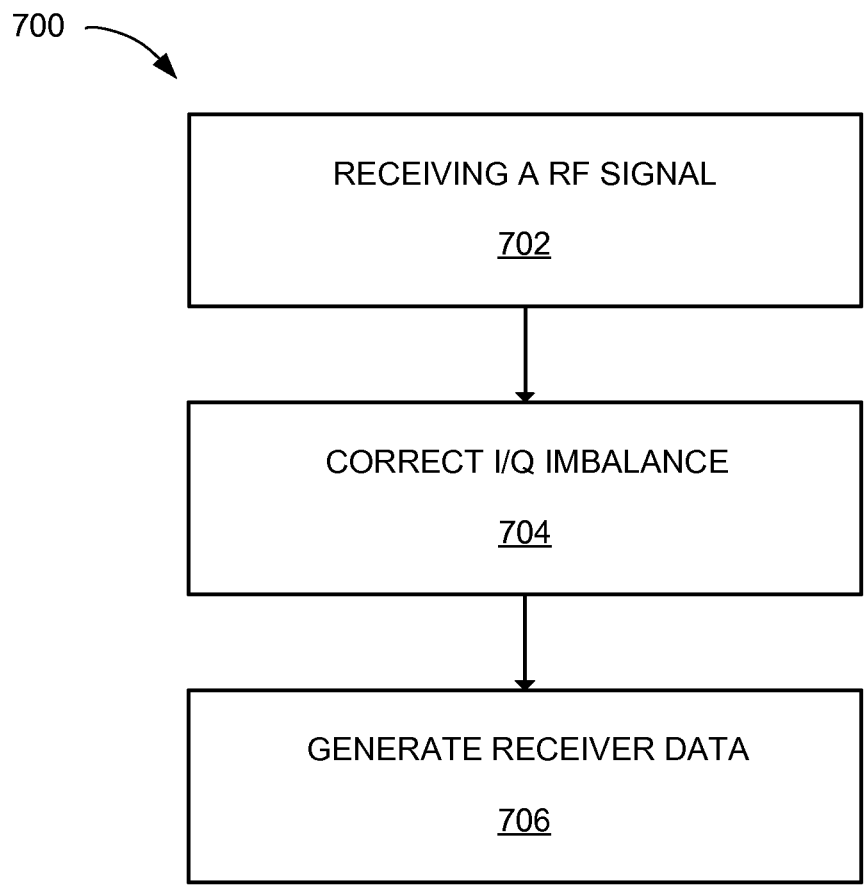
FIG. 7 is a flow chart of a method of operation of a wireless communication system in an embodiment of the present invention.

Referring now to FIG. 7, therein is shown a flow chart of a method 700 of operation of a wireless communication system 100 in an embodiment of the present invention. The method 700 includes: tuning a receiver front end for receiving a radio-frequency signal in a block 702; correcting, with an in-phase/quadrature (I/Q) compensation module, an I/Q imbalance from the receiver front end including estimating by a linear minimum mean-square error (LMMSE) module in a block 704; and processing by a base band receiver for digitizing an output of the I/Q compensation module for generating a receiver data in a block 706.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description.

Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a wireless communication system comprising:
    tuning a receiver front end configured to receive a radio-frequency signal and generate a composite signal;
    correcting an in-phase/quadrature (I/Q) imbalance from the receiver front end including:
        generating a correction signal using filter coefficient based on a conjugate sate of I/Q imbalance measurement ratio between measured values associated with the I/Q imbalance,
        calculating an error sample by combining the composite signal and the correction signal,
        outputting a compensated signal by combining the error sample and the composite signal; and
    processing by a base band receiver for digitizing the compensated signal for generating a receiver data.

2. The method as claimed in claim 1 wherein tuning the receiver front end includes generating an in-phase signal and a quadrature signal.

3. The method as claimed in claim 1 wherein correcting the I/Q imbalance from the receiver front end includes generating a conjugate complex.

4. The method as claimed in claim 1 wherein correcting the I/Q imbalance from the receiver front end includes generating the error sample based on using the filter coefficient approximated based only on the I/Q imbalance measurement ratio and a scalar.

5. The method as claimed in claim 1 wherein correcting the I/Q imbalance from the receiver front end includes accessing a second adder for combining the error sample and a scaled output of the composite signal.

6. A method of operation of a wireless communication system comprising:
    tuning a receiver front end configured to receive a radio-frequency (RF) signal and generate a composite signal including amplifying the RF signal by a low-noise amplifier;
    correcting, with an in-phase/quadrature (I/Q) compensation module, an I/Q imbalance from the receiver front end including:
        generating a correction signal from a conjugate complex by a linear minimum mean-square error (LMMSE) module using filter coefficient based on a conjugate of I/Q imbalance measurement ratio between measured values associated with the I/Q imbalance,
        calculating an error sample by combining the composite signal and the correction signal, and
        outputting a compensated signal by combining the error sample and a scaled output of the composite signal; and
    processing by a base band receiver for digitizing the compensated signal of the I/Q compensation module for generating a receiver data.

7. The method as claimed in claim 6 wherein tuning the receiver front end includes generating an in-phase signal and a quadrature signal including generating the composite signal.

8. The method as claimed in claim 6 wherein correcting, with the in-phase/quadrature (I/Q) compensation module, the I/Q imbalance from the receiver front end includes inputting the conjugate complex to the linear minimum mean-square error (LMMSE) module.

9. The method as claimed in claim 6 wherein correcting, with the in-phase/quadrature (I/Q) compensation module, the I/Q imbalance from the receiver front end includes generating the error sample and subtracting the error sample from the composite signal for generating the receiver data.

10. The method as claimed in claim 6 wherein correcting, with the in-phase/quadrature (I/Q) compensation module, the I/Q imbalance from the receiver front end includes accessing a second adder by the error sample including coupling the composite signal to the second adder for subtracting the error sample.

11. A wireless communication system comprising:
    a receiver front end configured to receive a radio frequency (RF) signal and generate a composite signal;
    an in-phase/quadrature (I/Q) compensation module, coupled to the receiver front end, is configured to correct an I/Q imbalance from the receiver front end includes:
        a filter coefficient module configured to generate a correction signal using filter coefficient based on a conjugate of I/Q imbalance measurement ratio between measured values associated with the I/Q imbalance,
        a first adder, coupled to the filter coefficient module, configured to combine the correction signal and the composite signal to output an error sample, and
        a second adder, coupled to the first adder and an input scaling module, configured to combine the error sample and a scaled output of the composite signal for outputting a compensated signal; and
    a base band receiver, coupled to the I/Q compensation module, is configured to generate a receiver data from the compensated signal.

12. The system as claimed in claim 11 wherein the receiver front end includes a mixer circuit having an in-phase signal output and a quadrature signal output.

13. The system as claimed in claim 11 wherein the in-phase/quadrature (I/Q) compensation module includes a conjugation module configured to generate a conjugate complex for correcting the I/Q imbalance from the receiver front end.

14. The system as claimed in claim 11 wherein the in-phase/quadrature (I/Q) compensation module includes the first adder configured to generate the error sample based on using the filter coefficient approximated based only on the I/Q imbalance measurement ratio and a scalar.

15. The system as claimed in claim 11 wherein the in-phase/quadrature (I/Q) compensation module includes a negative input of the second adder coupled to the first adder configured to correct the I/Q imbalance from the receiver front end for combining the error sample and a scaled output of the composite signal.

16. The system as claimed in claim 11 wherein:
    the receiver front end includes a low-noise amplifier configured to amplify the RF signal; and
    the in-phase/quadrature (I/Q) compensation module includes a linear minimum mean-square error (LMMSE) module configured to estimate a conjugate complex.

17. The system as claimed in claim 16 wherein the receiver front end includes a mixer circuit having an in-phase signal output and a quadrature signal output coupled to a phase filter configured to generate the composite signal.

18. The system as claimed in claim 16 wherein the in-phase/quadrature (I/Q) compensation module includes a conjugation module configured to generate a conjugate complex for correcting the I/Q imbalance from the receiver front end.

19. The system as claimed in claim 16 wherein the in-phase/quadrature (I/Q) compensation module includes the first adder configured to generate the error sample to correct the I/Q imbalance from the receiver front end including a negative input of the second adder coupled to the error sample.

20. The system as claimed in claim 16 wherein the in-phase/quadrature (I/Q) compensation module includes a negative input of the second adder, coupled to a first adder, configured to subtract the I/Q imbalance from the receiver front end including the composite signal coupled to the second adder.

* * * * *